United States Patent

Plumer

[15] 3,653,684
[45] Apr. 4, 1972

[54] PRESSURE VESSEL VALVE ASSEMBLY
[72] Inventor: Roy D. Plumer, Santa Barbara, Calif.
[73] Assignee: General Motors Corporation, Detroit, Mich.
[22] Filed: June 18, 1970
[21] Appl. No.: 47,200

[52] U.S. Cl..............................280/150 AB, 222/5, 222/500, 137/38
[51] Int. Cl.......................................................B60r 21/10
[58] Field of Search................137/38, 68; 280/150; 296/84; 222/3, 5, 500; 116/114

[56] References Cited

UNITED STATES PATENTS

| | | | |
|---|---|---|---|
| 3,430,979 | 3/1969 | Terry et al. | 280/150 |
| 2,649,311 | 8/1953 | Hetrick | 280/150 |
| 3,105,506 | 10/1963 | Beeby | 137/38 |
| 2,834,609 | 5/1958 | Bertrand | 280/150 |
| 3,197,234 | 7/1965 | Bertrand | 280/150 |
| 3,428,022 | 2/1969 | Ledley | 137/67 |

*Primary Examiner*—Kenneth H. Betts
*Attorney*—W. E. Finken and Herbert Furman

[57] ABSTRACT

A pressure vessel for an inflatable restraint cushion contains superatmospheric fluid. The vessel opens to an annular passageway which in turn opens radially for communication with the cushion adjacent a closed end thereof. The passageway is sealed intermediate its ends by a rupturable main diaphragm. A slidable piston is located within the passageway adjacent the pressure vessel and is normally held against movement by a shearable pin carried by the piston and fitting within openings in the wall of the passageway. The piston is not sealed to the passageway so that both faces of the piston are thus subjected to the pressure of the fluid. A rupturable auxiliary diaphragm closes an opening which communicates the one portion of the passageway between the piston and main diaphragm with the atmosphere. An acceleration responsive sensor is mounted on the passageway and, upon receiving an acceleration pulse of predetermined amplitude and time, releases an operator to rupture the auxiliary diaphragm and vent the one portion of the passageway to atmosphere. The differential pressure drives the piston along the passageway and through the main diaphragm to rupture this diaphragm and communicate the cushion with the pressure fluid for inflation thereof. A metal plug at the closed end of the passageway is engaged by the piston to arrest its movement.

5 Claims, 3 Drawing Figures

PATENTED APR 4 1972 3,653,684

INVENTOR.
Roy D. Plumer
BY
Herbert Furman
ATTORNEY

PRESSURE VESSEL VALVE ASSEMBLY

This invention relates to pressure vessel valve assemblies and more particularly to a pressure vessel valve assembly for releasing the fluid contents of a pressure vessel to inflate an inflatable cushion upon the pressure vessel receiving an acceleration pulse of predetermined amplitude and time.

Generally the valve assembly of this invention includes a main diaphragm blocking communication of the pressure vessel with the inflatable cushion. A diaphragm rupturing piston is normally subjected on each face thereof to the super atmospheric pressure fluid in the vessel. An auxiliary diaphragm between one face of the piston and the main diaphragm is ruptured by a sensor released operator when the vessel receives an acceleration pulse of predetermined amplitude and time to thereby rupture the auxiliary diaphragm and vent the one face of the piston to the atmosphere. The resultant differential pressure drives the piston through the main diaphragm to release the pressure fluid to the cushion.

One of the features of this invention is that the rupture of a main diaphragm blocking communication of a pressure vessel with an inflatable cushion is accomplished by a differential pressure driven piston. Another feature of this invention is that the piston is normally located in predetermined spaced relationship to the main diaphragm. A further feature of this invention is that the piston has both faces thereof exposed at all times to the super atmospheric pressure of the vessel contents and one face thereof is exposed to ambient pressure by rupture of an auxiliary diaphragm when the pressure vessel receives an acceleration pulse of predetermined amplitude and time. Yet another feature of this invention is that the piston is slidably received within an elongated annular passageway having one end communicating with the vessel and sealed intermediate the ends thereof by the main diaphragm, with the piston being located in predetermined spaced relationship to the main diaphragm upstream thereof by a shearable member connecting the piston with the passageway, the passageway communicating radially with the inflatable cushion downstream of the main diaphragm and including a soft metal plug at the other end thereof for engagement by and arrest of the piston.

These and other features of the valve assembly of this invention will be readily apparent from the following specification and drawings wherein.

Figure 1:
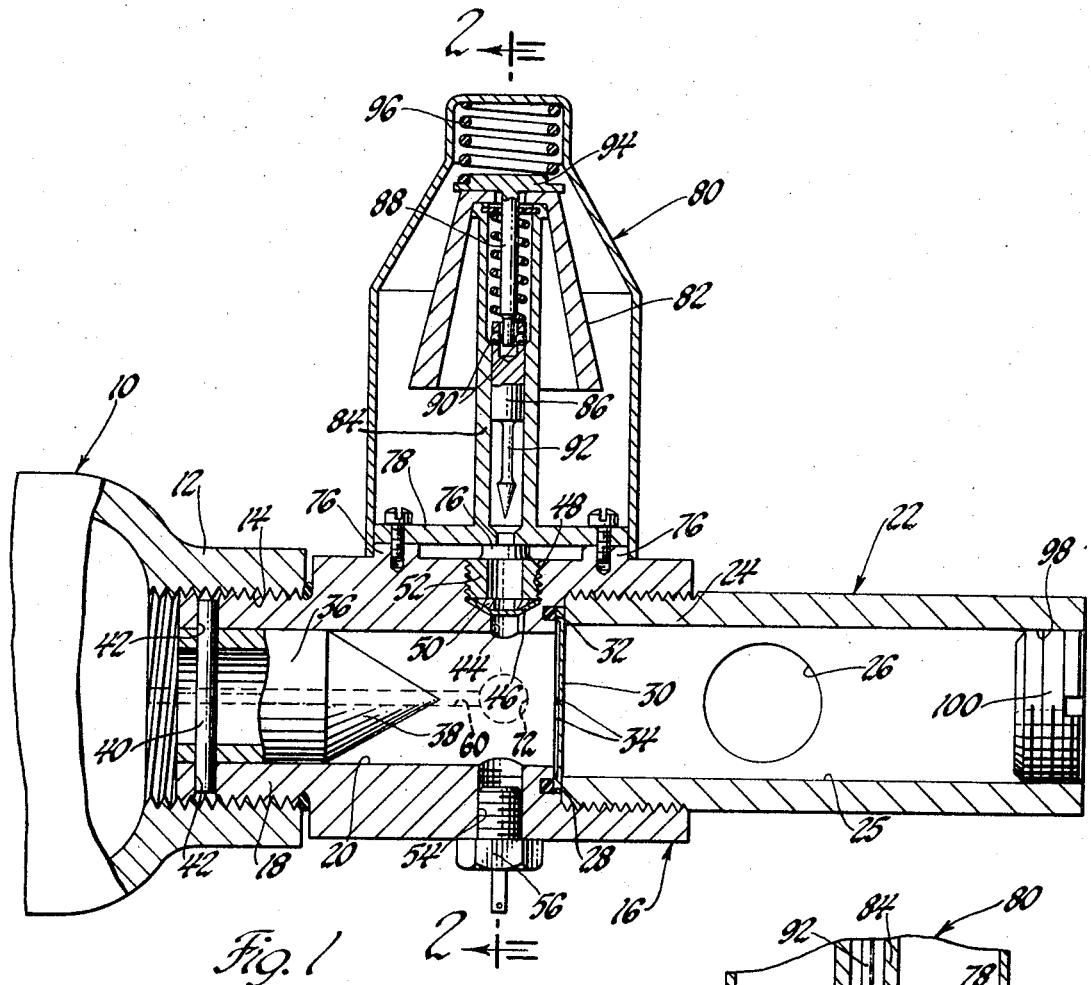
FIG. 1 is a sectional view of a valve assembly according to this invention with the main diaphragm and auxiliary diaphragm being shown in normal or unruptured condition.

Referring now particularly to FIG. 1, a conventional pressure vessel 10 is conventionally mounted on a vehicle and includes a cylindrical neck 12 which is internally threaded at 14. A hollow cylindrical member 16 has an externally threaded reduced diameter end 18 received within the neck 12 of the pressure vessel to connect the member 16 and vessel. Member 16 includes an internal cylindrical bore or passageway 20 which opens at one end of member 16 to the interior of the vessel. A second hollow cylindrical member 22 has a threaded one end 24 received within the internally threaded other end of the member 16. Member 22 includes an internal cylindrical bore or passageway 25 of slightly greater OD than passageway 20 and providing a continuation thereof. Intermediate its ends, member 22 is provided with a diametrically opposite pair of radial openings 26 which are conventionally connected to a manifold which in turn communicates with a conventional diffuser tube. Mounted about the diffuser tube in a conventional manner is an inflatable restraint cushion for seated vehicle occupant usage in the event of the vehicle receiving through impact an acceleration pulse which exceeds a predetermined amplitude and time.

The one end 24 of the member 22 provides one side of an internal circular groove 28 which opens to the passageway 20 of the member 16. A circular metal main diaphragm 30 has its peripheral edge portion received within the groove 28 with the seal between the groove 28 and the edge portion of the diaphragm being provided in a conventional manner by an O-ring 32 which is received within a circular groove in the member 16 opening axially to the groove 28. The diaphragm 30 is provided with a pair of intersecting diametrical cross grooves 34 which divide the diaphragm into four equal quadrants for a purpose to be hereinafter described. It can be seen that the diaphragm 30 blocks communication of the passageway 20 with the passageway 25 and openings 26.

A hollow cylindrical piston 36 is freely slidably mounted within the passageway 20 and includes a conical or tapered one face 38. A shear pin 40 extends through aligned openings in the wall of the piston 36 and into aligned radial bores 42 in the end 18 of member 16 to locate the piston 36 in a predetermined relationship with respect to the member 16 and also locate the one face 38 of the piston in a predetermined spaced relationship to the diaphragm 30. Clearance is provided between the outer surface of the piston 36 and the wall of the passageway 20.

A radial opening 44 through the wall of the member 16 is sealed by a frusto-conically shaped auxiliary diaphragm 46 which seats against the like shaped base of a threaded bore 48 and is held in place by a back-up washer 50 and a hollow annular plug 52 threaded within the bore 48. Located diametrically opposite to the bore 44 is a threaded radial bore 54 which receives a conventional pressure switch 56 adapted to be electrically connected in a conventional manner to an indicator light on the instrument panel of the vehicle.

Figure 2:
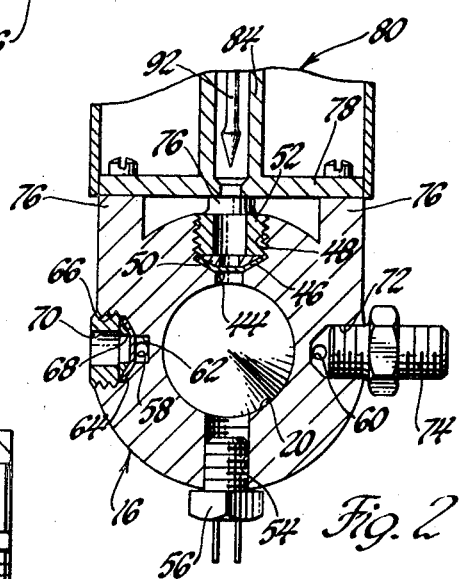
FIG. 2 is a sectional view taken generally along the plane indicated by line 2—2 of FIG. 1.

As shown in FIG. 2, the member 16 is provided with a pair of axial bores 58 and 60. Bore 58 opens to the interior of the vessel 10 and to a radial bore 62 of the member 16. Bore 62 is closed by a rupturable frusto-conically shaped diaphragm 64 which is seated against the like shaped base of a threaded bore 66 opening to the bore 62. A back-up washer 68 and a hollow threaded plug 70 seat the diaphragm 64. As will be apparent from further description, diaphragm 64 provides an overpressure relief device so that if the pressure within the vessel 10 exceeds a predetermined level, the diaphragm 64 will rupture and vent the contents of the vessel 10 to atmosphere.

The passageway 60 opens to a tapped bore 72 which receives the tapped end of a conventional fill plug 74.

From the foregoing description, it can be seen that the vessel 10 communicates with the passageway 20 by means of the clearance provided between the piston 36 and the wall of this passageway and that the passageway 20 is sealed from the atmosphere by means of the diaphragms 46, 30 and 64 and the switch 56 and plug 74. Normally the vessel 10 is filled with high pressure fluid, such as air, at 3,500 p.s.i., or nitrogen or carbon dioxide. The fluid is introduced into the vessel 10 by means of the plug 74 and bore 60 and flows from the vessel around the piston 36 into the passageway 20 so that both faces of the piston 36 are at equal pressure levels, that is, the pressure level of the fluid within the pressure vessel.

The member 16 includes four radial bosses 76 which mount a base support plate 78 of a seismic mass type omnidirectional sensor 80. Sensor 80 is essentially the same as that disclosed and claimed in copending application Ser. No. 31,086 filed Apr. 23, 1970, Otakar P. Prachar, now U.S. Pat. No. 3,592,156, and assigned to the assignee of this invention, and therefore no detailed description will be given.

Generally the sensor 80 includes a frusto-conically shaped seismic mass 82 which seats on the upper end of a tubular guide or support 84. An operator 86 is normally held against movement within the guide by means of a control pin 88 engaging three balls 90 to force these balls outwardly of radial openings in the operator and into engagement with a radial shoulder of the tube 84. The operator includes a sharp pointed fleche or firing pin 92. The upper end of the control pin 88 is provided with a head 94 which seats on the base of the seismic mass under the action of a compression spring 96. When the mass 82 receives an acceleration pulse of predetermined amplitude and time, it tilts relative to its seat on guide 84 to lift the pin 88 and permit the balls 90 to move inwardly of the operator 86 and in turn release the operator. When the operator is released, the firing pin 92 ruptures the diaphragm 46 as shown in FIG. 3.

Figure 3:
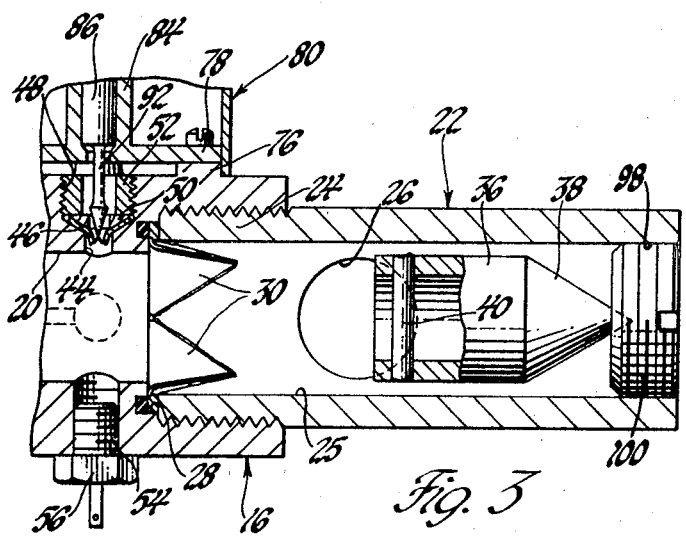
FIG. 3 is a partial view similar to FIG. 1 showing the main and auxiliary diaphragms in ruptured condition to release the contents of the pressure vessel for inflation of an inflatable restraint cushion.

Upon rupture of the diaphragm 46 as shown in FIG. 3, the portion of the passageway 20 between the face 38 of piston 36 and the diaphragm 30 is vented to the atmosphere through washer 50 and plug 52. The high pressure fluid in this portion of the passageway immediately vents to the atmosphere and the differential pressure thus applied to the piston 36 drives the piston 36 to the right after shearing the shear pin 40. As the piston 36 moves to the right, the sharp pointed face 38 ruptures the diaphragm 30 along grooves 34 into four quadrants as shown in FIG. 3. The greater OD of the passageway 25 permits the quadrants to be folded back against the wall thereof by the piston 36 without hindering its movement.

Upon rupture of the diaphragm 30, the openings 26 are, of course, communicated with the high pressure fluid in the vessel 10 and in turn inflate the inflatable cushion.

The other end of the member 22 is provided with an internally threaded bore 98 which receives a soft metal plug 100 of aluminum or any other similar energy absorbing material. As soon as the piston 36 passes the openings 26, the face 38 engages and partially penetrates the plug 100 as shown in FIG. 3 so as to arrest the movement of the piston.

It can thus be seen that the pressure vessel valve assembly of this invention includes a differential pressure actuated piston for rupturing a diaphragm to communicate the high pressure fluid contained within a pressure vessel with an inflatable cushion to inflate the cushion and provide an occupant restraint system.

If desired, the pressure switch 56 may be dispensed with, and the pressure relief diaphragm 64 may communicate directly with the passageway 20 rather than with the pressure vessel. Likewise, the fill plug 74 may also communicate directly with the passageway 20 so that the pressure vessel is filled from the passageway rather than the passageway being filled from the pressure vessel.

Although a particular type of sensor 80 is shown, it is believed apparent that other types of sensors may likewise be used, whether omnidirectional, bidirectional, or unidirectional to release an operator which in turn will rupture the auxiliary diaphragm to vent the one face 38 of the piston to atmosphere and in turn rupture the main diaphragm through movement of the piston under the differential pressure applied thereto.

Thus, this invention provides an improved pressure vessel valve assembly.

What is claimed is:

1. A pressure vessel valve assembly comprising, in combination, a pressure vessel communicating with an inflatable restraint cushion, a rupturable diaphragm blocking communication of the vessel with the inflatable cushion, a supply of fluid at super atmospheric pressure contained within the pressure vessel, diaphragm rupturing piston means located in predetermined relationship to the diaphragm, means equally applying the pressure fluid to opposite faces of the piston means, means for applying a differential pressure to the opposite faces of piston means in response to the pressure vessel receiving an acceleration pulse of predetermined amplitude and time to drive the piston means through the diaphragm and rupture the diaphragm to release the pressure fluid and inflate the inflatable cushion, and means for arresting the piston means upon rupture of the diaphragm.

2. A pressure vessel valve assembly comprising, in combination, a pressure vessel, a passageway communicating therewith and with an inflatable restraint cushion, a rupturable diaphragm blocking communication of the passageway with the inflatable cushion, a supply of fluid at super atmospheric pressure contained within the pressure vessel and passageway, a diaphragm rupturing piston located within the passageway in predetermined relationship to the diaphragm, means for communicating the portion of the passageway between the piston and the diaphragm to ambient atmospheric pressure in response to the pressure vessel receiving an acceleration pulse of predetermined amplitude and time to drive the piston through the diaphragm and rupture the diaphragm to release the pressure fluid and inflate the inflatable cushion, and means for arresting the piston upon rupture of the diaphragm.

3. A pressure vessel valve assembly comprising, in combination, a pressure vessel, an annular passageway communicating therewith and with an inflatable restraint cushion, a rupturable diaphragm blocking communication of the passageway with the inflatable cushion, a supply of fluid at super atmospheric pressure contained within the pressure vessel and passageway, an annular piston located within the passageway and having diaphragm rupturing means on one face thereof located in predetermined relationship to the diaphragm, means for communicating the portion of the passageway between the one face of the piston and the diaphragm to ambient atmospheric pressure in response to the pressure vessel receiving an acceleration pulse of predetermined amplitude and time, the resultant differential pressure between the piston faces driving the piston and diaphragm rupturing means through the diaphragm to rupture the diaphragm and release the pressure fluid to inflate the inflatable cushion, and means for arresting the piston upon rupture of the diaphragm.

4. A pressure vessel valve assembly comprising, in combination, a pressure vessel, having an annular passageway communicating therewith and with an inflatable restraint cushion, a rupturable diaphragm blocking communication of the passageway with the inflatable cushion, a supply of fluid at super atmospheric pressure contained within the pressure vessel and passageway, an annular piston located within the passageway and having diaphragm rupturing means on one face thereof, shearable means on the piston engageable with the passageway to locate the piston in predetermined relationship to the diaphragm, rupturable means blocking communication of the portion of the passageway between the one face of the piston and the diaphragm to ambient atmospheric pressure, means rupturing the rupturable means in response to the pressure vessel receiving an acceleration pulse of predetermined amplitude and time, the resultant differential pressure between the piston faces shearing the shearable means and driving the piston and diaphragm rupturing means through the diaphragm to rupture the diaphragm and release the pressure fluid to inflate the inflatable cushion, and means for arresting the piston upon rupture of the diaphragm.

5. A pressure vessel valve assembly comprising, in combination, a pressure vessel, an annular passageway communicating axially therewith and radially with an inflatable restraint cushion, a rupturable diaphragm locking communication of the passageway with the inflatable cushion, a supply of fluid at super atmospheric pressure contained within the pressure vessel and passageway, an annular piston located within the passageway and having a tapered one face, shearable means on the piston engageable with the passageway to locate the tapered face in predetermined relationship to the diaphragm, a second rupturable diaphragm blocking communication of the portion of the passageway between the one face of the piston and the first diaphragm to ambient atmospheric pressure, means rupturing the second diaphragm in response to the pressure vessel receiving an acceleration pulse of predetermined amplitude and time, the resultant differential pressure between the piston faces shearing the shearable means driving the tapered face of the piston through the first diaphragm to rupture the first diaphragm and release the pressure fluid to inflate the inflatable cushion, and energy absorbing means engageable by the tapered face of the piston for arresting the piston upon rupture of the first diaphragm.

* * * * *